Patented Sept. 11, 1923.

1,467,749

UNITED STATES PATENT OFFICE.

RAYMOND C. BENNER, OF BAYSIDE, NEW YORK, ASSIGNOR TO UNION CARBIDE & CARBON RESEARCH LABORATORIES, INC., A CORPORATION OF NEW YORK.

PROCESS OF MAKING STORAGE-BATTERY PLATES.

No Drawing.   Application filed July 29, 1922.   Serial No. 578,494.

*To all whom it may concern:*

Be it known that I, RAYMOND C. BENNER, a citizen of the United States, residing at Bayside, Long Island, in the county of Queens and State of New York, have invented certain new and useful Improvements in Processes of Making Storage-Battery Plates, of which the following is a specification.

This invention relates to the manufacture of storage battery plates of the "preformed" type, that is, plates which are ready for service as soon as suitable electrolyte is added to a battery containing them, as distinguished from those plates which require to be charged and discharged a number of times before they are "formed" by converting the active material thereof.

Preformed plates may be manufactured more economically than the formed plates since the active material therefor is a cheaper product than the litharge used in formed plates, the pickling and forming operations are eliminated, and the plates may be shipped dry, may be placed in service quickly by the addition of electrolyte, and reach full capacity in fewer cycles of charges and discharges. The body of active material of such initially formed or preformed plates should desirably be compact and strong to withstand handling and shipment in a dry state and, on the other hand, such material should be sufficiently porous to permit the acid electrolyte to diffuse rapidly enough to maintain the concentration of the acid in the plate nearly equal to that outside the plate. The primary object of this invention is to provide a preformed battery plate that meets these requirements.

Lead peroxid has generally not been employed as an active material because it has been the practice to form the plates after pasting, and also because the peroxid is the most insoluble of the oxids of lead in the common mineral acids and the most inactive towards the substances commonly used in pasted battery plates. In the usual formed positive battery plate, lead oxid other than lead peroxid, such as litharge, is applied as a paste to a grid or suitable conductive support and after pickling the same in dilute sulfuric acid to set the paste, the plates are placed in a forming bath and the active material is converted into lead peroxid by charging and discharging the battery a number of times, whereupon the latter is ready for service.

According to the present invention, the active material comprises lead peroxid which may be substantially pure. However, an impure lead peroxid, that is, one containing a small amount of lead sulfate, lead carbonate or other lead oxid, is in some respects more desirable. To the pure or impure lead peroxid is added a suitable salt, such as an alkali-metal bisulfate, adapted to react with the peroxid to bind the active material and also adapted to provide a soluble product which may be removed to leave the active material in a porous condition.

Sodium and potassium acid sulfates are examples of substances which are satisfactory as binders as well as porosifiers. The sodium or potassium bisulfate may be incorporated with the lead peroxid as a solution or, more desirably, in a dry crystalline or powdered state. Preformed positive plates which give a large portion of their capacity on initial discharge may be prepared by mixing from about 60 to 90% impure lead peroxid with from about 10 to 40% sodium or potassium bisulfate, and forcing such mixture in a dry state into a suitable grid with a pressure of from 5 to 25 tons per square inch. Moisture may be added to produce a mixture containing impure lead peroxid and a solution of sodium or potassium bisulfate varying from about 25 to 100% of saturation. It appears that the reaction of the alkali-metal bisulfate and the impure lead peroxid produces lead sulfate that assists in binding the material together. Sodium or potassium sulfates or other soluble salts which are formed by the interaction of the lead compounds with the sodium or potassium may be leached out when the plates are placed in the electrolyte, thereby leaving the plates porous. The degree of porosity depends upon the amount of bisulfate used and may therefore be varied considerably.

To obtain a more thorough bonding of the active material, a suitable non-conducting binding material such as rubber or celluloid, may be added to the mixture of impure lead peroxid and alkali-metal bisulfate. The rubber may be incorporated as a solution of rubber in benzene, and after the active material has been pressed into the grid, heat may be applied to vulcanize the rubber. For cold vulcanization, sulfur monochlorid with a solution of rubber in carbon bisulfid may be used. The porosity salt may be dissolved out to porosify the active material, as already indicated. A solution of celluloid in acetone may likewise be added, the solvent being evaporated to let the celluloid set in the active material. A suitable mixture for a satisfactory preformed plate of this type may contain from 50 to 90% lead peroxid, from 10 to 40% alkali metal sulfate, and from 2 to 10% rubber.

I claim:

1. Process of making a preformed storage battery plate that comprises mixing alkali-metal bisulfate with active material containing a predominating amount of lead peroxid, and applying such mixture to a suitable conductive support.

2. Process of making a preformed storage battery plate that comprises mixing alkali-metal bisulfate with active material containing a predominating amount of lead peroxid and a small amount of other lead compound, applying such mixture to a suitable conductive support, and removing soluble material therefrom.

3. Process of making a preformed storage battery plate that comprises mixing sodium acid sulfate with active material containing a predominating amount of lead peroxid and a small amount of lead sulfate, applying such mixture to a suitable conductive support, and removing soluble material therefrom.

4. Process of making storage battery plates that comprises mixing alkali-metal bisulfate and a non-conductive binding substance with active material containing a predominating amount of lead peroxid, and applying such mixture to a suitable conductive support.

5. Process of making preformed storage battery plates that comprises mixing alkali-metal bisulfate and a non-conductive binding substance with active material containing a predominating amount of lead peroxid and a small amount of other lead compound, applying such mixture to a suitable conductive support, and removing the soluble material therefrom.

6. Process of making preformed storage battery plates that comprises mixing sodium bisulfate and vulcanizable rubber with active material containing a predominating amount of lead peroxid and a small amount of lead sulfate, pressing such mixture into a suitable grid, vulcanizing the rubber, and removing the soluble material therefrom.

In testimony whereof I affix my signature.

RAYMOND C. BENNER.